Figure 1:
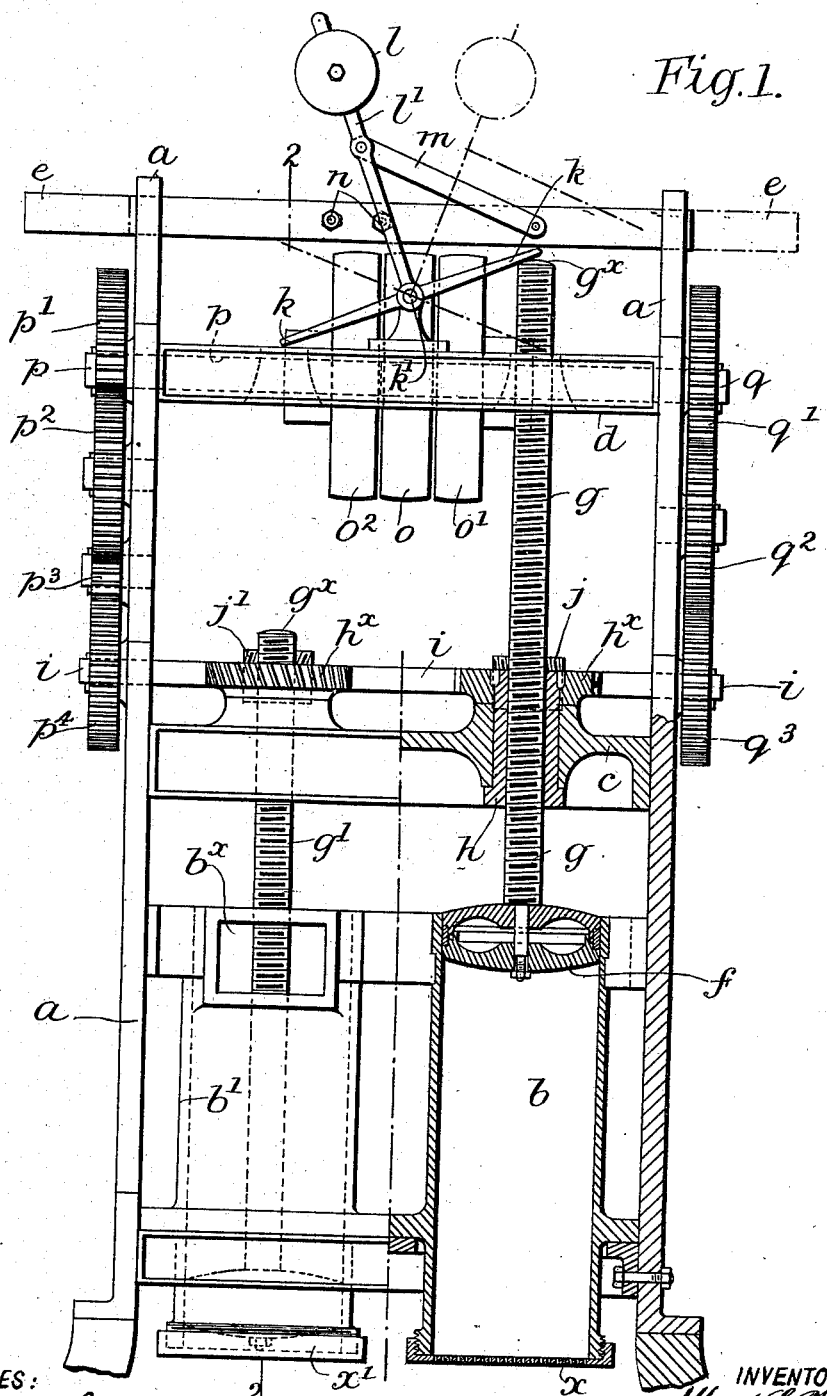

No. 716,235. Patented Dec. 16, 1902.
A. E. IVESON & A. R. WILSON.
PROCESS OF PREPARING FAT IN GRANULAR FORM.
(Application filed July 8, 1902.)

(No Model.) 2 Sheets—Sheet 1.

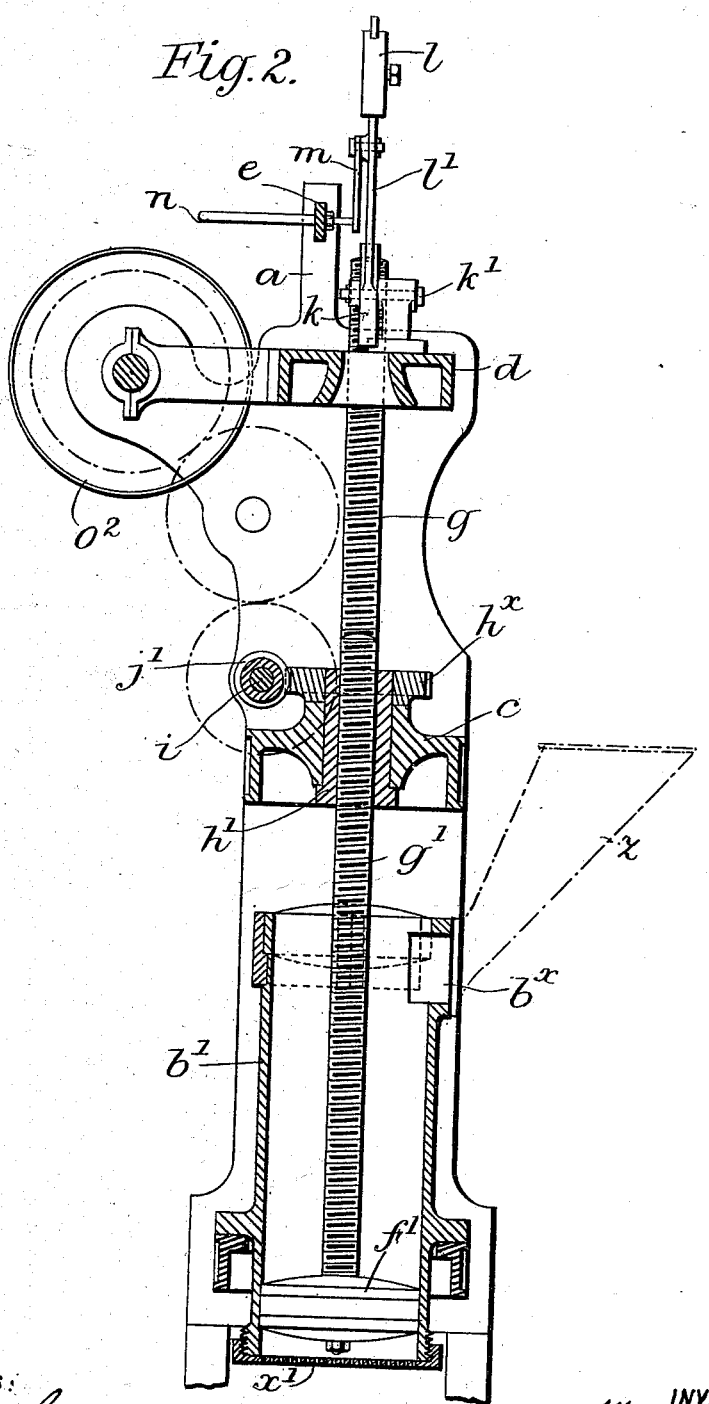

United States Patent Office.

ALBERT ERNEST IVESON, OF GAINSBOROUGH, AND ARCHIBALD RALPH WILSON, OF BRIGHTON, ENGLAND; SAID WILSON ASSIGNOR TO SAID IVESON.

PROCESS OF PREPARING FAT IN GRANULAR FORM.

SPECIFICATION forming part of Letters Patent No. 716,235, dated December 16, 1902.

Application filed July 8, 1902. Serial No. 114,748. (No specimens.)

*To all whom it may concern:*

Be it known that we, ALBERT ERNEST IVESON, manufacturer, residing at "The Hollies," Gainsborough, in the county of Lincoln, and ARCHIBALD RALPH WILSON, manager, of "Silverlea," Portland Villas, Hove, Brighton, in the county of Sussex, England, both subjects of the King of Great Britain and Ireland, have invented a Process for Preparing Suet or Fat in a Granular Form for Cooking Purposes, of which the following is a specification.

This invention relates to a new or improved process of preparing suet or fat in a finely-divided form—*i. e.*, "granular form"—for cooking purposes, and has for its object to convert suet or fat into a convenient and advantageous form for cooking purposes or the like.

The process consists, essentially, in taking suet or fat of a character adapted to be disintegrated and purifying same, compressing said fat after same has been purified and forcing same under pressure into cords, strings, or lengths (hereinafter for the sake of brevity referred to as "cords") in a compressed form of small area in cross-section and of cylindrical or any other suitable shape in cross-section, powdering or coating said cords as they are formed with any suitable powder or pulverulent material, (hereinafter referred to as "powder,") breaking up said cords into short lengths or bodies as said cords are formed, further dividing or breaking up these cords into smaller particles or grains of the size ultimately desired and advantageously sieving said particles, so as to get same of a more or less even size, and then packing or storing the suet or fat thus "granulated" in suitable vessels or holders, which may, if desired, be hermetically sealed, as hereinafter fully described.

In the accompanying drawings is illustrated a suitable machine or apparatus for the purpose of forming the purified fat into cords in carrying out this part of the process according to our present invention.

Figure 1 is a front elevation of such machine, which is a duplex machine. Fig. 2 is a vertical sectional view on line 2 2, Fig. 1.

Referring to the accompanying drawings, $a$ is a frame in which two cylinders or compression-chambers $b\ b'$ are mounted, (which latter may be of any suitable shape in cross-section, but are advantageously made cylindrical, and whatever their shape may be in cross-section will hereinafter be referred to as "cylinders,") and above said cylinders are fixed "cross-heads" $c$ and $d$ and a reciprocatory slide-bar $e$, adapted to slide through the frame $a$.

$f\ f'$ are ram-heads, pistons, or plungers adapted to fit more or less accurately within the barrel or bore of the cylinders $b\ b'$, respectively, which plungers $f\ f'$ may be provided with any suitable packing or may be of any suitable construction adapted for the purpose of compressing the purified fat placed in said cylinders $b\ b'$ (through the opening $b^{\times}$, provided in the upper part of each cylinder, $z$ being a funnel for receiving and guiding the suet through the opening $b^{\times}$ into said cylinders) and forcing same out in cores or cords through the series of apertures in the cylinder ends or perforated plates $x\ x'$, which latter are advantageously made easily removable—for instance, may be screwed onto the cylinder ends, as shown in the drawings, or otherwise suitably secured thereto—for the purpose of cleaning, affording access to the interior of the cylinders, &c., or instead of the perforated plates $x\ x'$ we may employ a series of nipples or other suitable series of outlets through which the fat is forced in a compressed state.

The plungers $f\ f'$ are revolubly or otherwise suitably attached to the piston-rod or plunger operating spindles $g\ g'$, which in the case illustrated are spindles provided with a screw-thread of suitable pitch—say three threads per inch—which screw through the internally-screw-threaded thimbles or sleeves $h\ h'$, which latter are journaled or adapted to revolve in the cross-head $c$, but prevented from moving endwise through or with respect to said cross-head $c$. Each of the internally-screw-threaded revoluble sleeves $h\ h'$ is provided at its upper part with a worm-wheel $h^{\times}$.

$i$ is a worm-shaft journaled in the frame $a$ and provided with two separate worms $j\ j'$, which latter gear with the aforesaid worm-wheel $h^x$, and thereby revolve the sleeves $h\ h'$, which latter will consequently, through the spindles $g\ g'$, be operated in such wise that while one spindle is raised the other will be lowered, and therefore by introducing any suitable reversing mechanism or means to alternately reverse the rotation of said sleeves $h\ h'$ thereby each plunger $f\ f'$ will alternately be raised and lowered.

The reversing means shown in the drawings act as follows: A lever $k$ is pivoted at $k'$ to the cross-head $d$, with the ends of said lever extending over the path of travel of the spindle ends $g^x$ of the spindles $g\ g'$, respectively. This lever $k$ is provided with a jockey-weight $l$ on the arm $l'$ thereof, which latter is formed on or fixed at right angles to said lever $k$, (or other suitable means may be employed to render said lever "dead-beat,") and to this arm $l'$ is pivoted a link $m$, which at its other end is pivoted to the slide-bar $e$, which latter carries a belt-fork $n$.

$o\ o'\ o^2$ are fast and loose pulleys—namely, $o$ is a loose pulley, $o'$ and $o^2$ being fast pulleys arranged on separate shafts and acting as follows: As the spindle $g$ rises the upper end thereof strikes the lever $k$ and throws the arm $l'$ and weight $l$ thereon over to the left, as shown in Fig. 1, and consequently by means of the slide-bar $e$ and belt-fork $n$ the driving-belt is caused to drive the fast pulley $o^2$, which latter through its shaft $p$ and train of wheels $p'$, $p^2$, $p^3$, and $p^4$ and worm-shaft $i$ and worms thereon will thereby cause the spindle $g$ to descend and the spindle $g'$ to rise until the latter strikes the end $k'$ of the lever $k$ and throws said lever $k$ and arm $l'$ to the right into the position shown in dotted lines in Fig. 1, whereupon the belt-fork $n$ will move the driving-belt onto the driving-pulley $o'$, which latter through its shaft $q$ (independent of the shaft $p$) and train of driving-wheels $q'\ q^2\ q^3$ (which latter may be either one more or one less in number than the train of wheels $p'\ p^2\ p^3\ p^4$) will now revolve the worm-shaft $i$ in the opposite direction, and consequently will move the spindle $g'$ downward and the spindle $g$ upward until the top end of the latter strikes the lever $k$, when the motion is again reversed, and so on.

The process according to this invention is as follows: We first take raw animal fat or suet or any other suitable fat (which in all cases must be of a character adapted to be disintegrated or granulated, according to our present invention) and melt same down, and we sieve or strain this melted fat, so as to remove any fibrous or coarse material therefrom, (or we may otherwise treat such fat or suet in any suitable manner, so as to purify same or remove therefrom those parts which are not suitable for granulating or cooking purposes,) and the purified fat is then allowed to cool and harden or solidify. This purified and solidified fat or refined suet is then compressed and forced through perforations or holes, tubes, nipples, or equivalent of any suitable character and in any suitable and convenient manner—such, for instance, as hereinbefore fully described with reference to the drawings hereunto annexed—so as to thereby divide said fat or suet into cords, strings, cores, or lengths of any suitable shape in cross-section, advantageously cylindrical, (and hereinafter referred to as "cords," as aforesaid,) which cords as they emerge through said perforations, tubes, nipples, &c., (all of which we will hereinafter refer to as the "perforated plate") will automatically break off or drop off in various lengths, and, furthermore, as said cords emerge from said perforated plate we dust, powder, or coat them with any suitable powder or pulverulent material, (advantageously a mixture of ordinary flour and salt may be employed,) so as to prevent (or reduce the liability of) said cords reuniting or adhering to one another, this coating also serving to act as a preservative, and we then further divide or break up in any suitable manner these cords into shorter lengths or smaller particles or grains or granular form advantageously by shaking or agitating same in a sieve, the mesh or openings of which may be of any suitable size, according to the size of grain or particles to which it is desired to reduce the fat, and we continue the flouring or powdering or coating of the particles during this final period of the process, and this shaking or agitation is continued until the particles are reduced to such a size that they will drop through the sieve, while meantime every particle will have been thoroughly coated all over, and thereby we produce thoroughly-coated particles of fat of granular-like form and of more or less even size and which latter remain in such disintegrated or granular-like form, same being thoroughly coated in the process of producing them, as aforesaid.

It will be obvious that the flour or powder is only to be used for the purpose of preventing the particles sticking together, and therefore only the minimum amount of such flour or powder need be used to effect this purpose, and, moreover, this coating of the particles and the compression to which the latter have been subjected in the formation of the cords jointly and severally assist in the preservation or keeping qualities which it will be found are possessed by fat granulated according to this process. The suet or fat in this granular-like form is now packed in any suitable manner—for instance, in tins (which may be hermetically sealed or otherwise, as desired,) or cardboard boxes or otherwise, but advantageously in boxes or holders of a non-compressible character or not-easily-compressible character.

Having now described our invention, what we claim as new, and desire to secure by Letters Patent of the United States, is—

1. The herein-described process of preparing suet or fat in a granular form; which consists in, first purifying fat of a character adapted to be disintegrated, compressing said fat after same has been purified, converting said compressed fat into "cords," powdering said cords as they are formed and as they break off into various lengths, breaking up said short lengths into small particles or grains, and further powdering same as they are reduced to said small particles or grains to thereby thoroughly coat same ready for storing or packing, substantially as and for the purposes hereinbefore set forth.

2. The herein-described process of preparing suet or fat in a granular form; which consists in first purifying fat of a character adapted to be disintegrated, compressing said fat after same has been purified, converting said compressed fat into "cords," powdering said cords as they are formed and as they break off into various lengths, breaking up said short lengths into small particles or grains by shaking or agitation in a sieve, and further powdering same in the sieve while they are being reduced therein to small particles or grains to thereby thoroughly coat same so that on passing through the sieve same are ready for storing or packing, substantially as and for the purposes hereinbefore set forth.

In witness whereof we have hereunto set our hands in presence of two witnesses.

ALBERT ERNEST IVESON.
ARCHIBALD RALPH WILSON.

Witnesses:
R. WESTACOTT,
ALFRED NUTTING.